United States Patent [19]

English

[11] Patent Number: 5,592,899
[45] Date of Patent: Jan. 14, 1997

[54] METHOD AND DEVICE FOR FEEDING DOGS

[76] Inventor: Edward E. English, 7801 Fall Creek Rd., Indianapolis, Ind. 46256-3254

[21] Appl. No.: 489,351

[22] Filed: Jun. 12, 1995

[51] Int. Cl.[6] ........................................ A01K 5/01
[52] U.S. Cl. ........................ 119/61; 119/51.01; 119/174
[58] Field of Search .................. 119/51.01, 51.5, 119/61, 174, 710, 711; 424/84; 426/1

[56] References Cited

U.S. PATENT DOCUMENTS

| | | | |
|---|---|---|---|
| 3,104,648 | 9/1963 | Fisher | 119/711 |
| 3,203,806 | 8/1965 | Young | 426/1 |
| 4,256,054 | 3/1981 | Hitchcock | 119/51.5 X |
| 4,886,016 | 12/1989 | Atchley | 119/61 |
| 5,109,800 | 5/1992 | Williams | 119/61 |
| 5,346,710 | 9/1994 | Geitner | 119/61 X |

FOREIGN PATENT DOCUMENTS 3221286  12/1983  Germany.
WO91/04657  4/1991  Japan.

*Primary Examiner*—Robert P. Swiatek
*Assistant Examiner*—Elizabeth Shaw
*Attorney, Agent, or Firm*—Woodard, Emhardt, Naughton, Moriarty & McNett

[57] ABSTRACT

The food receiving surface of a dog food bowl is sprayed or otherwise coated with a substance which has an aroma that is attractive to the dog to be fed, so that the dog would be attracted to the food and proceed to eat, even if the food is dry and of a nature that otherwise the dog would not eat.

7 Claims, 1 Drawing Sheet

METHOD AND DEVICE FOR FEEDING DOGS

BACKGROUND OF THE INVENTION

1. Field of the Invention

This invention relates to a method and means for encouraging dogs to eat food which they would otherwise shun.

2. Description of the Prior Art

Many foods and devices for feeding animals are known, some of which are patented. Some are intended to permit animals to feed only at certain times, others to limit the amount of food, others to automatically refill the feeder, and others for other purposes. There is a U.S. Pat. No. 5,109,800 issued to Williams on May 5, 1992 which teaches applying a material to a feeding bowl as an insect deterrent. A 1983 German reference No. DE-3221286 to Krenzer discloses a chemical that is applied directly to feedstuffs to make them more attractive and acceptable to cats and/or dogs, but cannot be smelled by humans. The 1991 international publication WO 91/04657 for Kojima of an application which originated in Japan appears to disclose a cat attractant applicator.

SUMMARY OF THE INVENTION

Described briefly, my invention is to help in the feeding of dry meal formula to dogs. This will be done according to my invention with a highly aromatic substance which can be sprayed, poured, wiped, or in any other fashion applied to the interior of the dog's feeding bowl. The aroma would be one that is attractive to the dog to be fed, so that the dog would be attracted to the food and proceed to eat, even if the food is of a nature that otherwise the dog would not eat.

DESCRIPTION OF THE PREFERRED EMBODIMENT

Figure 1:
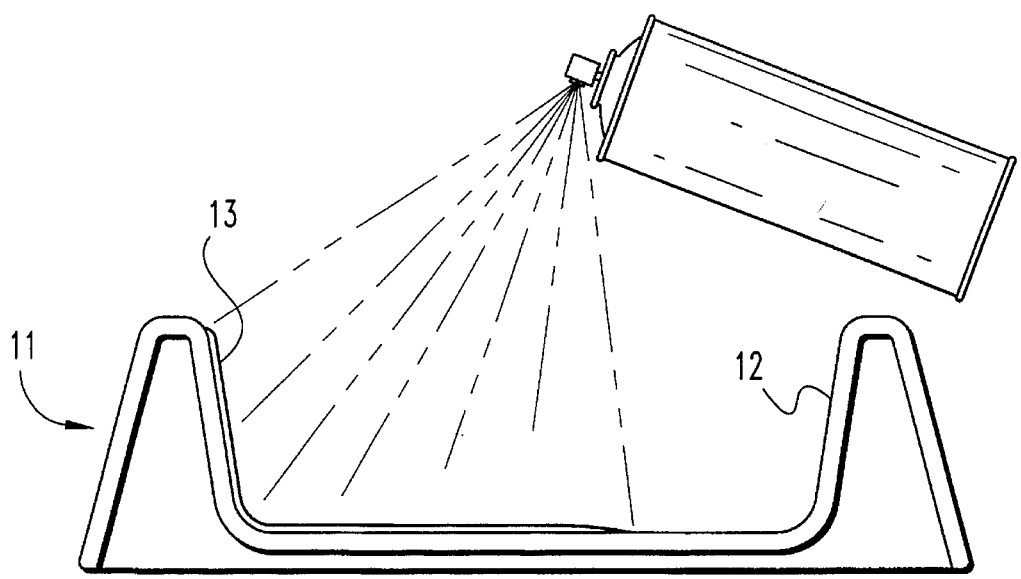
FIG. 1 of drawing shows a feeding bowl being coated with a dog food attractant.
Figure 2:
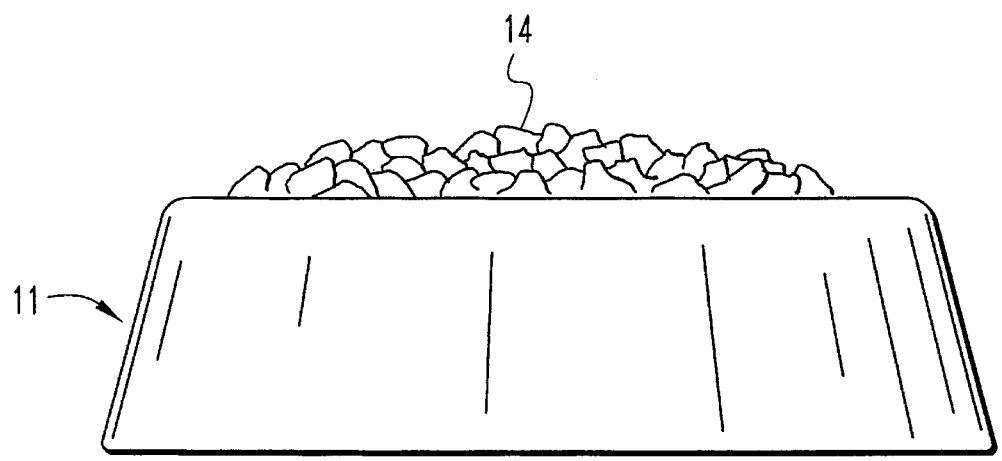
FIG. 2 shows the coated bowl filled with dry food for the dog to eat.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In the drawing, a clean, dog food bowl 11 is coated on its food receiving surface 12 with a product 13 that is attractive to the dog to eat. More specifically, the product would smell strongly of (but not be limited to) various foods that a dog would naturally eat, or like to eat if the food did not occur in nature. Examples of such aromas are cheeses, chocolate, beef, pork, chicken, turkey, cinnamon, fish, etc. Dogs always smell what they are about to eat before they eat it.

For one example, the product, as heretofore stated, could be sprayed onto the interior 12 of the feeding container 11 from either a spray bottle or an aerosol, or it would be wiped onto the interior of the feeding container from a paste type product or in the form of a "stick deodorant", or in other convenient ways. Then the dry food 14 which may be odorless or tasteless or otherwise one which the dog would not ordinarily and voluntarily eat, is placed in the bowl. Notwithstanding how the product 13 is applied, the dog would smell the strong aroma and would believe the aroma, even though the dry meal 14 formula may be completely tasteless, or odorless.

The product 13 could be made to further benefit the dog by including vitamins, minerals, and other nutrients which the dog would obtain by licking the interior of the feeding container clean. Since the product would have an aroma that the dog owner can sense, the owner will know if and when more should be applied to the container. More of the product 13 can be sprayed or otherwise applied to the bowl before the next feeding.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

What is claimed is:

1. A dog feeding method comprising the steps of:

providing an open-topped container;

coating a portion of the container with a material that smells like a food that the dog naturally eats;

placing in the container a dry food; and presenting the container with said food therein to the dog.

2. The method of claim 1 and wherein:

the step of placing the dry food includes selecting a food to which the dog is not naturally attracted.

3. The method of claim 1 and wherein the step of placing the dry food includes selecting a food which is odorless.

4. The method of claim 1 and further comprising the step of:

selecting for the coating, a material having an odor recognized by humans as characteristic of a food naturally eaten by the dog to be fed.

5. The method of claim 1 and wherein the coating step includes coating the inside surface of the container, on which the dry food is subsequently placed.

6. The method of claim 5 and wherein the container is a food bowl, and the aroma of the coating material is that of a meat.

7. The method of claim 6 and wherein the coating step comprises spraying the coating material onto the interior of the bowl.

* * * * *